(12) United States Patent
Liu et al.

(10) Patent No.: US 12,275,364 B2
(45) Date of Patent: Apr. 15, 2025

(54) STEERING WHEEL COMPONENT AND STEERING WHEEL ASSEMBLY

(71) Applicant: Yanfeng International Automotive Technology Co., Ltd., Shanghai (CN)

(72) Inventors: Cheng Liu, Shanghai (CN); Zhiyuan Chen, Shanghai (CN); Lei Yang, Shanghai (CN); Kuan Liu, Shanghai (CN)

(73) Assignee: Yanfeng International Automotive Technology Co., Ltd., Shanghai (CN)

( * ) Notice: Subject to any disclaimer, the term of this patent is extended or adjusted under 35 U.S.C. 154(b) by 0 days.

(21) Appl. No.: 18/558,282

(22) PCT Filed: Jul. 28, 2022

(86) PCT No.: PCT/CN2022/104561
§ 371 (c)(1),
(2) Date: Oct. 31, 2023

(87) PCT Pub. No.: WO2023/005640
PCT Pub. Date: Feb. 2, 2023

(65) Prior Publication Data
US 2024/0217470 A1    Jul. 4, 2024

(30) Foreign Application Priority Data
Jul. 29, 2021    (CN) .......................... 202110860700.8

(51) Int. Cl.
*B60R 21/2165*    (2011.01)
*B60Q 1/00*    (2006.01)
(Continued)

(52) U.S. Cl.
CPC ...... *B60R 21/21658* (2013.01); *B60Q 1/0082* (2013.01); *B60Q 5/003* (2013.01);
(Continued)

(58) Field of Classification Search
CPC .......... B60R 21/21658; B60R 21/2165; B60R 21/21656; B60R 21/203; B60R 21/2032;
(Continued)

(56) References Cited

U.S. PATENT DOCUMENTS

| | | |
|---|---|---|
| 5,338,906 A | 8/1994 | Yokota |
| 5,569,893 A | 10/1996 | Seymour |
| 5,642,901 A | 7/1997 | Bowman et al. |
| 5,678,849 A | 10/1997 | Davis |

(Continued)

FOREIGN PATENT DOCUMENTS

| | | |
|---|---|---|
| CN | 110194208 A | 9/2019 |
| CN | 111469908 A | 7/2020 |

(Continued)

OTHER PUBLICATIONS

Definition of substantial; https://www.merriam-webster.com/dictionary/substantially; Sep. 22, 2024 (Year: 2024).*

*Primary Examiner* — Keith J Frisby
(74) *Attorney, Agent, or Firm* — COOLEY LLP

(57) ABSTRACT

The present invention relates to a steering wheel component (2) and a steering wheel assembly comprising the steering wheel component (2). The steering wheel component (2) comprises an airbag door cover (21), wherein the airbag door cover (21) has an integral panel (210), wherein the panel (210) has a first area (31) for closing an airbag housing (22) and a second area (32), which is arranged beside the first area (31) and is configured as an operating surface for a multifunction switch (3).

19 Claims, 5 Drawing Sheets

(51) Int. Cl.
*B60Q 5/00* (2006.01)
*B60R 21/203* (2006.01)
*B62D 1/04* (2006.01)

(52) U.S. Cl.
CPC .......... *B60R 21/2037* (2013.01); *B62D 1/046* (2013.01); *B60K 2360/1446* (2024.01); *B60K 2360/782* (2024.01)

(58) Field of Classification Search
CPC ............ B60R 21/2035; B60R 21/2037; B60Q 5/003; B60Q 1/0082; B62D 1/046; B60K 2360/143; B60K 2360/782; B60K 2360/1446
USPC ........................................................ 280/731
See application file for complete search history.

(56) References Cited

U.S. PATENT DOCUMENTS

| | | | |
|---|---|---|---|
| 2004/0084291 A1* | 5/2004 | Adachi | B60Q 3/283 200/61.54 |
| 2005/0012310 A1 | 1/2005 | Rhea | |
| 2016/0207489 A1 | 7/2016 | Honmatsu et al. | |
| 2022/0001827 A1* | 1/2022 | Kring | B60Q 3/283 |

FOREIGN PATENT DOCUMENTS

| | | | | |
|---|---|---|---|---|
| CN | 113085550 A | * | 7/2021 | ............ B60K 37/00 |
| CN | 216034620 U | | 3/2022 | |
| DE | 102010049987 A1 | * | 5/2012 | ........... B60Q 1/0082 |
| DE | 102021200983 A1 | * | 8/2022 | ........... B60R 13/005 |
| WO | WO-2023005640 A1 | | 2/2023 | |

* cited by examiner

STEERING WHEEL COMPONENT AND STEERING WHEEL ASSEMBLY

RELATED APPLICATIONS

This application is a national stage of International Application No. PCT/CN2022/104561, filed on Jul. 8, 2022, which claims priority to Chinese Patent Application No. 202110860700.8, filed on Jul. 29, 2021. Both of the aforementioned applications are hereby incorporated by reference in their entireties.

TECHNICAL FIELD

The present invention relates to the technical field of vehicle technology, and in particular relates to a steering wheel component and a steering wheel assembly comprising the same.

BACKGROUND OF INVENTION

A steering wheel assembly may be a critical part of a vehicle. The steering wheel assembly may be mainly used to control a driving direction of the vehicle. During the driving, a driver may operate other functions through the steering wheel assembly, such as activation or deactivation of a driving assistance function, change of driving modes, adjustment of a sound volume in the vehicle and so on. In this situation, at least one hand of the driver can't control the driving of the vehicle, and is used to operate the other functions, which may affect the driving safety of the vehicle.

In addition, an airbag is usually integrated in the center of a steering wheel assembly. In a normal operation of a vehicle, the airbag doesn't operate, and only an airbag door cover is visible in the center of the steering wheel assembly, while the other components of the airbag are hidden under the airbag door cover and are invisible. When the vehicle has a collision, a folded cushion of the airbag should be inflated very quickly, break through the airbag door cover in the center of the steering wheel assembly, and pop out of the airbag door cover as the inflated cushion. The inflated cushion forms a damping cushion between an occupant and hard objects in the vehicle, and thus protecting the occupant from an injury or at least reducing the injury. Because of the operation principle of the airbag, the visible airbag door cover in the center of steering wheel assembly is very limited with respect to the manufacturing process and the design space due to safety reasons. Because the airbag door cover and the other parts of the steering wheel assembly around the airbag door cover can't be achieved by the same process, the appearance of the whole steering wheel assembly is fragmented.

FIGS. 1 and 2 show a conventional steering wheel assembly known in practice, wherein FIG. 1 is an assembled view of the steering wheel assembly and FIG. 2 is an exploded view of the steering wheel assembly. The steering wheel assembly comprises a steering wheel body 101 having three spokes. An airbag 102 as a module is mounted in the center of the steering wheel body 101. Multifunction switches 103 are respectively provided at two sides of the airbag 102 on the steering wheel body 101. There are necessary gaps 104 between the airbag 102 and the multifunction switches 103. A horn activation assembly 105 may be integrated in the airbag 102, and may comprise an upper activation member, a lower activation member and an elastic element 106 (typically a spring) therebetween. The upper activation member and the lower activation member have matching activation contacts 107, 108. When the activation contacts 107, 108 contact each other, a vehicle horn is turned on and sounds.

The airbag 102 and the multifunction switches 103 have different functions, and their visible skins are usually made of different raw materials by different manufacturing processes. They are designed independently. Boundary gaps 104 are necessary between the airbag 102 and the multifunction switches 103. Typically, the multifunction switches 103 have a plurality of buttons 109 for operating different functions, wherein activation of different functions is realized by pressing the different buttons 109. The buttons 109 are independent of each other, and thus there are a large amount of boundary lines 110 in the multifunction switches 103.

The horn activation assembly 105 may be activated by pressing the airbag door cover of the airbag 102. During the process of activation of the vehicle horn, the airbag 102 swings. For ensuring that the vehicle horn can be turned on and sound, the boundary gaps 104 between the airbag 102 and the multifunction switches 103 should be large enough. If the gaps 104 disappear with the swing of the airbag 102, but the vehicle horn is still not turned on, then the vehicle horn operates abnormally, which may affect the driving safety.

Due to the large gaps 104 and the boundary lines 110 between the buttons 109, the overall appearance of the steering wheel assembly is complicated and fragmented. In addition, the gaps 104 and the boundary lines 110 cause a large amount of engineering resources consumed in the design and in the manufacture for ensuring that the sizes of the gaps don't exceed an allowable value and for ensuring the uniformity of the gaps, otherwise the overall quality of the steering wheel assembly would be reduced.

SUMMARY OF INVENTION

An object of the present invention is to provide a steering wheel component and a steering wheel assembly comprising the same, wherein the steering wheel component allows a good appearance of a steering wheel assembly, improves a control function of the steering wheel assembly, and provides a safe and comfortable operation experience.

This object may be achieved by a steering wheel component. The steering wheel component comprises an airbag door cover having an integral panel, wherein the panel has a first area for closing an airbag housing and a second area, which is arranged beside the first area and is configured as an operating surface for a multifunction switch.

By the steering wheel component according to the present invention, the gaps between the airbag and the multifunction switches in the prior art can be cancelled, and preferably the boundary lines in the multifunction switches in the prior art can also be cancelled, so that a steering wheel assembly comprising the steering wheel component has a good appearance. Meanwhile, the steering wheel component can improve a control function of the steering wheel assembly and can provide a safe and comfortable operation experience.

In some embodiments, the panel may have one central first area and two second areas at two sides of the first area.

In some embodiments, the panel may extend substantially linearly.

In some embodiments, the panel may have an integral continuous visible surface. In particular, the visible surface may be a flat surface or a smooth curved surface.

In some embodiments, the airbag door cover may have a weak line at a back side of the panel in the first area of the panel, wherein the weak line is configured, so that an inflating cushion can tear the weak line and pop out of the airbag door cover through the torn weak line when the airbag is activated.

In some embodiments, the airbag door cover may have a door cover wall at a back side of the panel in the first area of the panel, wherein the door cover wall is integrally formed with the panel or is fixedly connected with the panel. Preferably, the door cover wall is connected with an airbag housing, especially in a detachable manner. A folded cushion can be received in a space surrounded by the airbag housing and the airbag door cover.

In some embodiments, the steering wheel component may comprise a support plate configured to be mounted to a steering wheel body of a steering wheel assembly, wherein at least one part of the steering wheel component is mounted to the support plate.

In some embodiments, the airbag housing may be fixed to the support plate.

In some embodiments, the steering wheel component may comprise a horn activation assembly, which comprises an upper activation part, a lower activation part and at least one elastic element that is arranged between the upper activation part and the lower activation part and is configured for separating the upper activation part from the lower activation part, wherein an elastic force of the at least one elastic element can be overcome by pressing the first area of the airbag door cover, so that the upper activation part and the lower activation part approach to each other and thus a vehicle horn can be activated.

In some embodiments, the upper activation part may be fixed relative to the airbag door cover, and the lower activation part may be fixed relative to the support plate.

In some embodiments, the operating surface may be a touch operating surface.

In some embodiments, the airbag door cover may have a weak groove between the first area and the second area at a back side of the panel, wherein the weak groove is configured to reduce vibration transmission between the first area and the second area.

In some embodiments, the multifunction switch may comprise a touch-sensitive film arranged at a back side of the panel in the second area, wherein the touch-sensitive film is configured to detect a touch on the operating surface, wherein an electric signal of the touch-sensitive film can be transmitted to a controller.

In some embodiments, the multifunction switch may comprise a multifunction switch sub-assembly, which may comprise a stroke sensor for detecting a pressing stroke when the operating surface is pressed, wherein an electric signal of the stroke sensor can be transmitted to a controller.

In some embodiments, the stroke sensor may be an infrared sensor or a force sensor. The infrared sensor may directly detect the pressing stroke, while the force sensor can detect a force in dependence on the pressing stroke and thus indirectly detect the pressing stroke.

In some embodiments, the controller may be configured to activate one of the functions of the multifunction switch in dependence on a pressed position on the operating surface only if both the electric signal of the touch-sensitive film and the electric signal of the stroke sensor exist.

In some embodiments, the controller may be integrated in the multifunction switch sub-assembly.

In some embodiments, the multifunction switch sub-assembly may comprise a vibration exciter connected to the controller, wherein the vibration exciter is configured to generate a vibration that can be transmitted to the operating surface when the multifunction switch is activated.

In some embodiments, the multifunction switch sub-assembly may comprise an upper switch shell and a lower switch shell as well as at least one elastic element that is arranged between the upper switch shell and the lower switch shell and is configured for separating the upper switch shell from the lower switch shell.

In some embodiments, the upper switch shell may be fixedly connected with the panel of the airbag door cover at a back side of the panel in the second area of the panel.

In some embodiments, the lower switch shell may be fixedly connected with the support plate.

In some embodiments, the operating surface may have one or more switch indicators corresponding to the respective functions of the multifunction switch.

In some embodiments, the operating surface may have a finger guiding feature beside the switch indicator.

In some embodiments, the multifunction switch sub-assembly may have a light source and a light guide, which are configured to illuminate the switch indicator.

In some embodiments, the support plate may comprise a bottom plate, opposite side walls protruding from two opposite edges of the bottom plate, and side plates protruding outward from the side walls, wherein the airbag housing is mounted in a mounting space defined by the bottom plate and the side walls, and one respective multifunction switch sub-assembly is mounted on each side plate between this side plate and the respective operating surface.

In some embodiments, on each side plate, between this side plate and the respective operating surface, a horn activation assembly may be mounted beside the multifunction switch sub-assembly. Preferably, the horn activation assembly may be arranged between the airbag and the multifunction switch sub-assembly. The multifunction switch sub-assembly and the horn activation assembly may be formed integrally or separately.

In some embodiments, the steering wheel component may have a substantially T-shaped structure, wherein a handle of the T-shaped structure comprises the airbag, and two side limbs of the T-shaped structure each comprise one multifunction switch, wherein the horn activation assembly is arranged in the handle of the T-shaped structure or forms a transition from the handle to the respective side limb.

In some embodiments, the steering wheel component may comprise a touch-operatable activation device for a vehicle horn, wherein the controller is configured to turn on and activate the vehicle horn when no electric signal of the touch-sensitive film exists, but the electric signal of the stroke sensor exists.

Another aspect of the present invention relates to a steering wheel assembly. The steering wheel assembly comprises a steering wheel body and a steering wheel component mounted to the steering wheel body.

In some embodiments, two ends of the panel of the steering wheel component may be respectively adjacent to a steering wheel rim.

In some embodiments, in an initial position of the steering wheel assembly, the steering wheel component may extend in a lateral direction of the vehicle.

In some embodiments, a space surrounded by a steering wheel rim may be divided into an upper space and a lower space by the steering wheel component, wherein there are no spokes in the upper and the lower space.

The technical features mentioned above, the technical features to be mentioned below and the technical features obtainable from the accompanying drawings can be arbitrarily combined with each other, as long as the combined technical features are not contradictory with each other. All feasible feature combinations are the technical contents contained in the description.

BRIEF DESCRIPTION OF DRAWINGS

The present invention is described in more detail with the aid of exemplary embodiments with reference to the accompanying drawings, wherein.

DETAILED DESCRIPTION OF DRAWINGS

Figure 3:
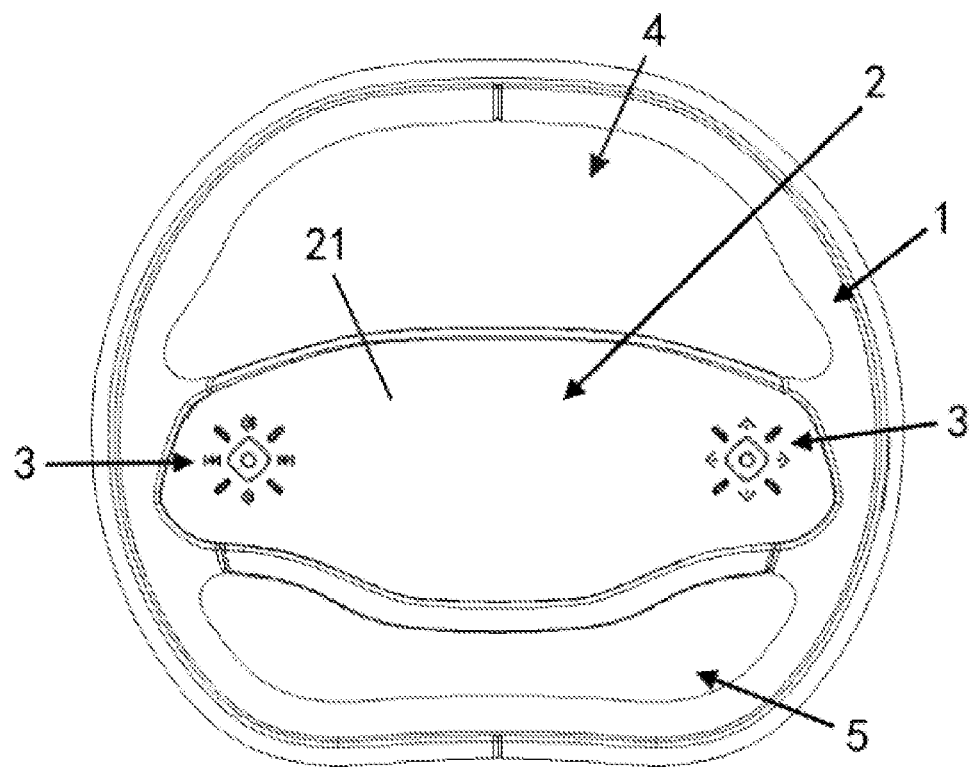
FIG. 3 is an assembled view of a steering wheel assembly according to an embodiment of the present invention.
Figure 4:
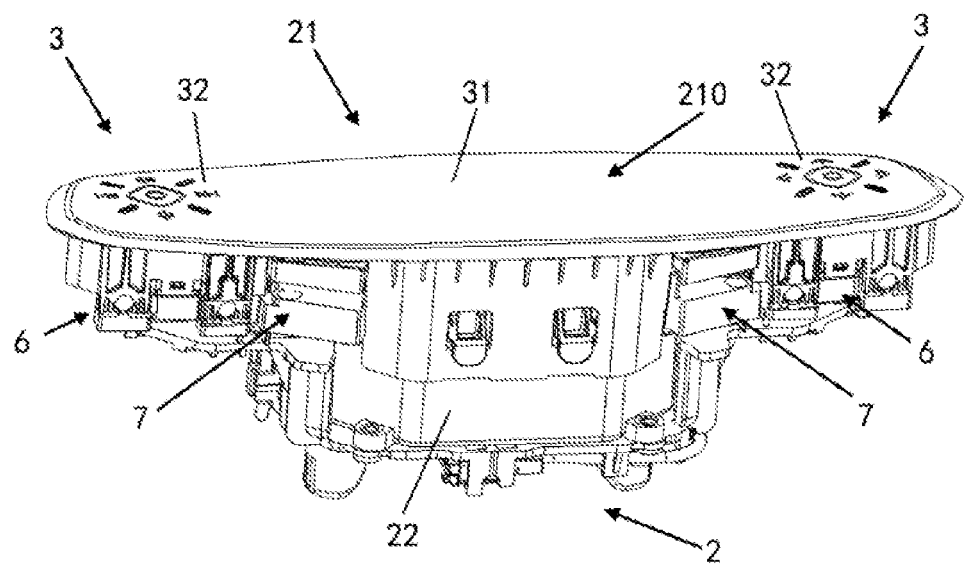
FIG. 4 is a perspective view of a steering wheel component of the steering wheel assembly of FIG. 3 in an assembled state.
Figure 5:
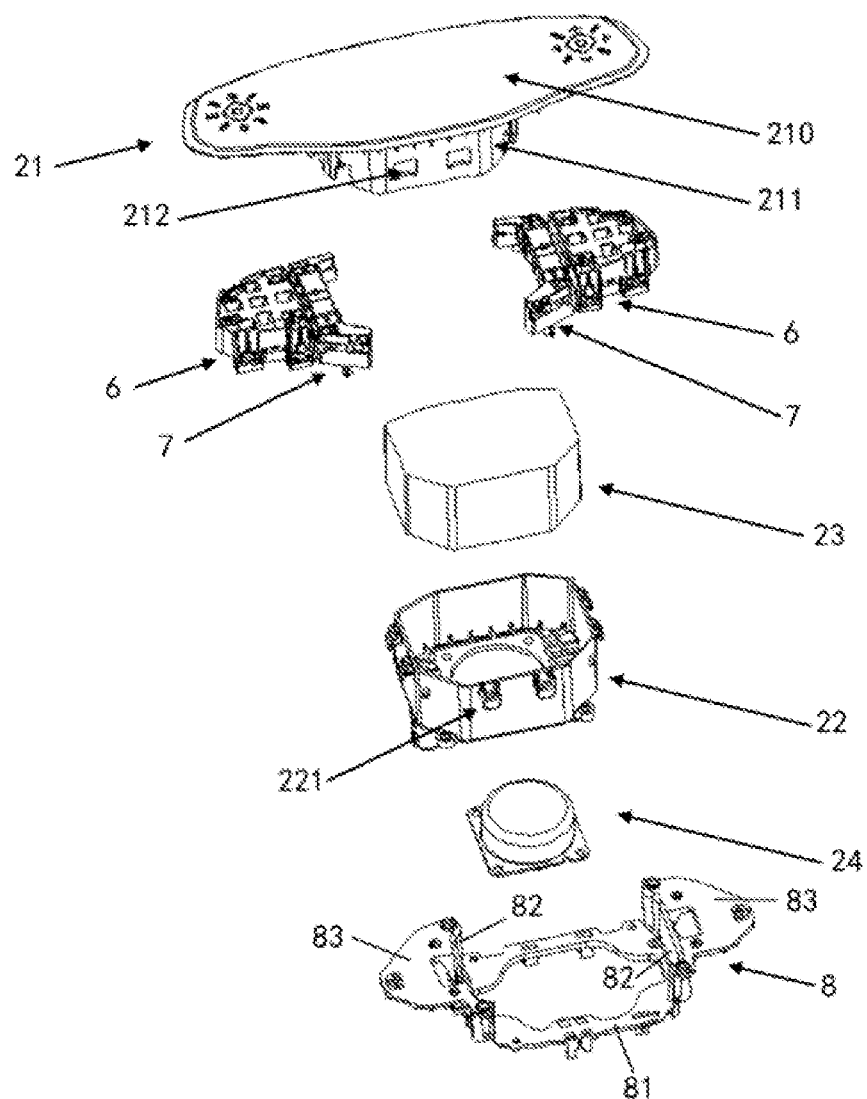
FIG. 5 is an exploded view of the steering wheel component of FIG. 4.

A general overview of a steering wheel component according to an embodiment of the present invention and a general overview of a steering wheel assembly comprising the steering wheel component are described with reference to FIGS. 3 to 5. FIG. 3 is an assembled view of the steering wheel assembly. FIG. 4 is a perspective view of the steering wheel component of the steering wheel assembly of FIG. 3 in an assembled state. FIG. 5 is an exploded view of the steering wheel component of FIG. 4. FIGS. 6 to 10 show more details of the steering wheel component.

The steering wheel assembly as shown in FIG. 3 comprises a steering wheel body 1 and a steering wheel component 2 mounted to the steering wheel body 1. The steering wheel assembly is shown in an initial position, that is to say, a vehicle having the steering wheel assembly may drive straight in the initial position of the steering wheel assembly. Two ends of a panel 210 of an airbag door cover 21 of the steering wheel component 2 are adjacent to a steering wheel rim respectively. In the initial position of the steering wheel assembly, the steering wheel component 2 extends in a lateral direction of the vehicle. A space surrounded by the steering wheel rim is divided into an upper space 4 and a lower space 5 by the steering wheel component 2, and there are no spokes in the upper and the lower space. In comparison with the steering wheel assembly shown in FIG. 1, the steering wheel assembly shown in FIG. 3 has a simpler and more beautiful appearance. Gaps 104 and boundary lines 110 in the prior art are cancelled. In addition, the surface of the panel 210 of the airbag door cover 21 may be covered with a membrane or painted. Various beautiful colors and patterns can be realized by the arrangement of the membrane or by a painting process, which further promotes the high-quality appearance of the steering wheel component. At least a portion, especially the whole, of the airbag door cover 21 may be integrally made, for example by an injection molding process.

In an embodiment (not shown), the panel 210 may have exactly one arm extending from the center of the steering wheel body toward the steering wheel rim, and thus a continuous space is surrounded by the steering wheel rim.

In an embodiment (not shown), the panel 210 may have three or more arms extending from the center of the steering wheel body toward the steering wheel rim, and thus the space surrounded by the steering wheel rim may be divided into three or more spaces by these arms.

The steering wheel component 2 may have a central airbag and multifunction switches 3 at two sides of the airbag. As shown in FIG. 4, at the two sides of the airbag, between the airbag and the multifunction switches 3, respective horn activation assemblies 7 may be arranged.

The steering wheel component 2 comprises the airbag door cover 21 having the integral panel 210, wherein the panel 210 has a first central area 31 for closing an airbag housing 22 and two second areas 32 beside the first central area 31, wherein the second areas are configured as operation surfaces for the multifunction switches 3. The operating surfaces may be touch operating surfaces. The panel 210 may extend substantially linearly. The panel 210 may have an integral, flat and continuous visible surface. The airbag door cover 21 may have weak grooves 214 (see FIGS. 6 and 7) at a back side of the panel 210 between the first area 31 and the second areas 32, wherein the weak grooves are configured to reduce vibration transmission between the first area 31 and the second areas 32. In other words, the weak grooves 214 may constitute boundary lines between the first area and the second areas. The airbag door cover 21 may have a reduced thickness in the regions of the weak grooves 214.

Figure 6:
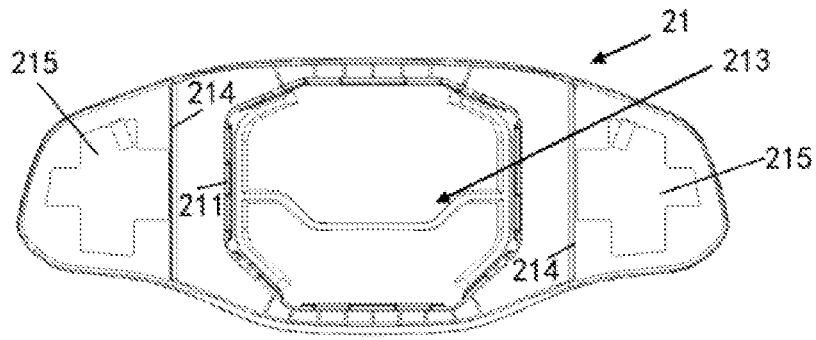
FIGS. 6 and 7 are a bottom view and a perspective view of an airbag door cover of an airbag of the steering wheel component of FIG. 4.
Figure 7:
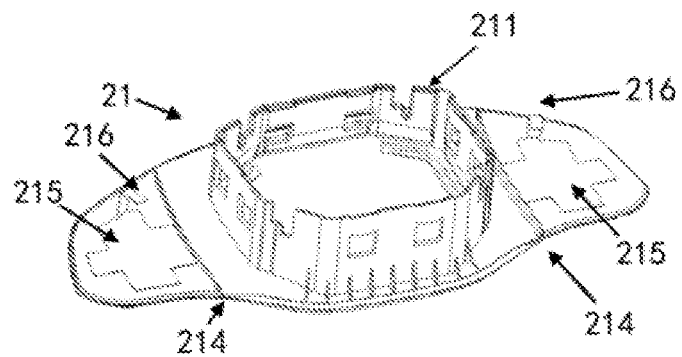

The airbag door cover 21 has a door cover wall 211 at the back side of the panel 210 in the first area 31 of the panel 210 (see FIGS. 5 to 7). The door cover wall 211 may be integrally formed with the panel 21 (for example by an injection molding process), or may be fixedly connected (for example by a screw connection, by friction welding and/or by bonding), and the door cover wall may be connected, for example in a detachable manner, to the airbag housing 22, wherein a folded cushion 23 is received in the airbag housing 22. At least one opening 212 is arranged in the door cover wall 211, and at least one hook 221 is arranged on the airbag housing 22. In the assembled state, the hook 221 passes through the opening 212, so that the airbag door cover 21 can't be separated from the airbag housing 22. A gap may be kept between the hook 221 and the opening 212, so that the airbag door cover 21 and the airbag housing 22 can move relative to each other against an elastic force of an elastic element. A gas generator 24 may be mounted to a bottom of the airbag housing 22. The gas generator 24 generates gas when it's activated, and the gas can be filled into the folded cushion 23, so that the cushion 23 is inflated. The airbag housing 22 may be mounted to a support plate 8, which may be mounted to the steering wheel body 1.

The airbag door cover 21 may have a weak line 213 (see FIG. 6) at the back side of the panel 210 in the first area 31 of the panel 210. The weak line 213 is configured, so that, when the airbag is activated, the inflating cushion 23 can tear the weak line 213 and pops out of the airbag door cover 21 through the torn weak line 213, so as to provide a damping function for a driver, for example in a collision event of a vehicle. The weak line 213 may be designed to have different paths according to requirements. The weak line 213 divides the airbag door cover 21 into at least two areas. The weak line 213 has a thickness lower than that of the airbag door cover 21. The weak line 213 may be generated in an injection molding process or by milling or by a laser weakening process.

Figure 1:
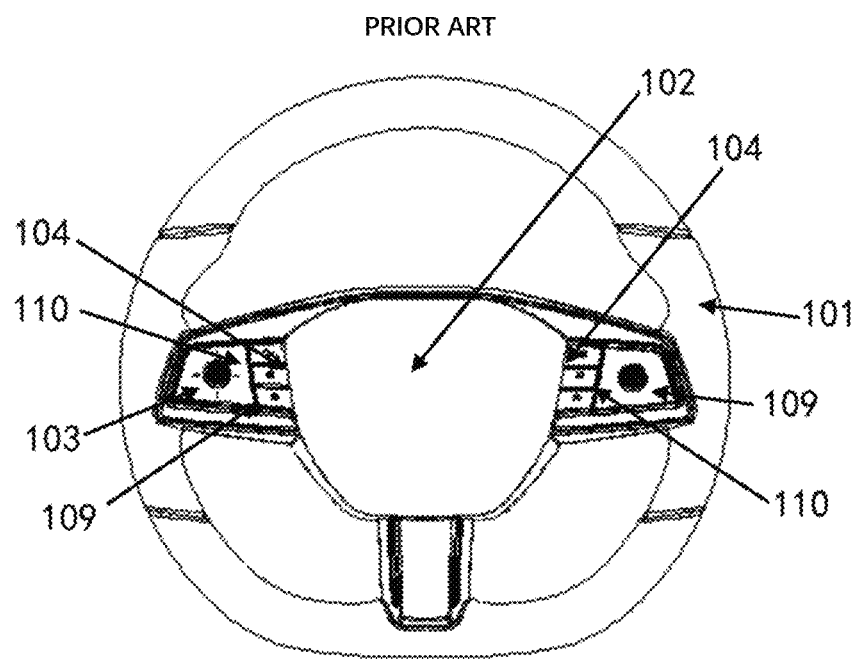
FIGS. 1 and 2 are an assembled view and an exploded view of a steering wheel assembly in the prior art.
Figure 2:
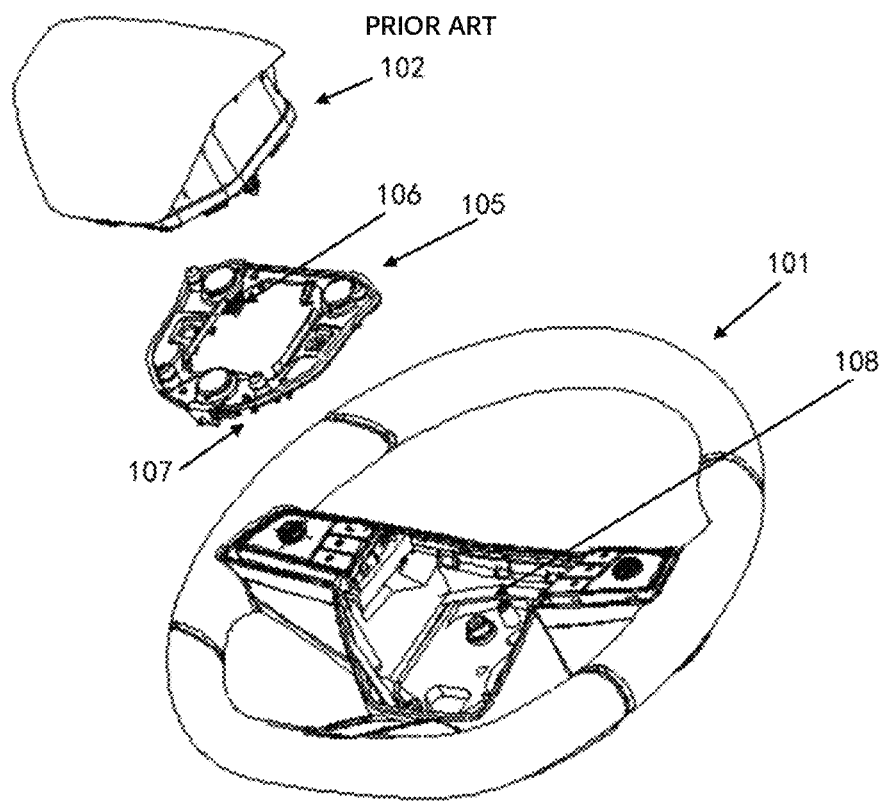

The steering wheel component 2 may comprise two horn activation assemblies 7 at the two sides of the airbag. The horn activation assemblies 7 may each comprise an upper activation part 71, a lower activation part 72 and at least one elastic element that is arranged between the upper activation part 71 and the lower activation part 72 and is configured for separating the upper activation part 71 from the lower activation part 72. By pressing the panel 210 of the airbag door cover 21, especially by pressing the first area 31 of the panel 210 of the airbag door cover 21, an elastic force of the at least one elastic element can be overcome, so that the upper activation part 71 and the lower activation part 72 approach each other. According to a typical first variant, the upper activation part 71 may have an activation contact, and the lower activation part 72 may have an activation contact, wherein when these activation contacts come into contact, a vehicle horn can be activated. According to an alternative second variant, which will be further explained later, a stroke sensor 12 can detect a relative movement of the upper activation part 71 and the lower activation part, generate an electric signal and transmit the electric signal to a controller 10, so that the controller 10 can determine to activate a horn activation function, and thus the vehicle horn can be activated. In addition, the above-mentioned first variant and the second variant may also be combined, for example both variants can take effect according to different pressing extents. When the pressing of the airbag door cover 21 is released, the upper activation part 71 and the lower activation part 72 can be separated from each other under the restoring action of the elastic force of the elastic element, and thus the activation of the vehicle horn is ended. The upper activation part 71 may be fixed relative to the airbag door cover 21, for example it may be fixed on the airbag door cover 21 or on the door cover wall 211. The lower activation part 72 may be fixed relative to the support plate 8, for example it may be fixed on the support plate 8 or on the airbag housing 22. In comparison with the prior art as shown in FIGS. 1 and 2, an essentially larger operating surface for activating the vehicle horn may be realized.

Figure 9:
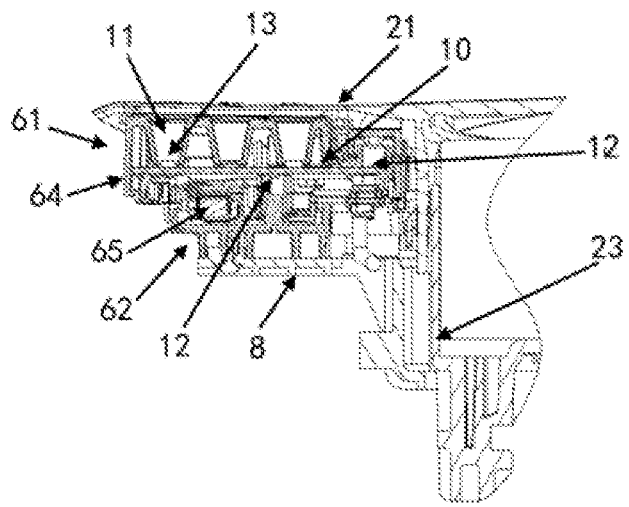

The multifunction switches 3 may comprise touch-sensitive films 215 (see FIGS. 6 and 7) arranged at the back side of the panel 210 in the second areas 32, wherein each of the touch-sensitive films is configured to detect the touch, for example, of a human finger, on the respective operating surface, wherein a signal of the respective touch-sensitive film can be transmitted to a controller 10 (see FIG. 9). The touch sensitive film 215 may be bonded on the back side of the panel 210. When a human finger touches the respective operating surface of the airbag door cover 21, the respective touch sensing film 215 can sense the finger's contact with the respective operating surface and generate an electric signal for such contact. The electric signal can be transmitted to the controller 10 through an interface 216 connected to the touch sensitive film 215. The respective operating surface may have one or more switch indicators 217 corresponding to the respective functions of the multifunction switch. For example, the multifunction switch 3 may comprise a switch indicator for increasing or decreasing the sound volume and a switch indicator for controlling the play of music or video. The switch indicators 217 may have vivid patterns for guiding a vehicle occupant to operate the switch indicators. The respective operating surface may have finger guiding features 218 beside the switch indicators 217, so that blind operation of the switch indicators can be realized, which can improve the driving safety of the vehicle. The finger guiding features 218 may be protrusions or depressions that the driver can feel with his finger. By touching the finger guiding features 218, the driver can determine the positions of different buttons of the multifunction switch when looking straight ahead in the driving of the vehicle.

The multifunction switches 3 may each comprise a multifunction switch sub-assembly 6, which may comprise a stroke sensor 12 for detecting a pressing stroke when the operating surface is pressed, wherein an electric signal of the stroke sensor 12 can be transmitted to the controller 10. At each side of the airbag, the multifunction switch sub-assembly 6 may be arranged beside the horn activation assembly 7. The multifunction switch sub-assembly 6 and the horn activation assembly 7 can be designed integrally or separately.

As shown in FIG. 4, the steering wheel component 2 may have a substantially T-shaped structure, wherein a handle of the T-shaped structure comprises the airbag, and two side limbs of the T-shaped structure each comprise one multifunction switch 3, wherein the respective horn activation assembly 7 forms a transition from the handle to the respective side limb of the T-shaped structure.

The multifunction switch sub-assembly 3 may comprise an upper switch shell 61 and a lower switch shell 62, and at least one elastic element 63 that is arranged between the upper switch shell 61 and the lower switch shell 62 and is configured for separating the upper switch shell 61 from the lower switch shell 62. The elastic element 63 may be, for example, a mechanical spring or a soft elastic rubber. The upper switch shell 61 may be fixedly connected with the panel 210 of the airbag door cover 21 at the back side of the panel in the respective second area 32 of the panel, such as by bonding, welding or screwing. The lower switch shell 62 may be fixedly connected with the support plate 8, such as by bonding, welding or screwing. The controller 10 is integrated in the respective multifunction switch sub-assembly 6.

The elastic element 63 of the multifunction switch sub-assembly 6 may be also configured as the elastic element of the horn activation assembly 7, and therefore, a separate elastic element for the horn activation assembly 7 may be spared. Another possibility is that the horn activation assembly 7 and the multifunction switch sub-assembly 6 may have their own elastic elements.

In addition, the multifunction switch sub-assembly 6 may comprise a vibration exciter 65, which is connected to the controller 10 and may be controlled by the controller 10. The vibration exciter 65 is configured to generate a vibration that can be transmitted to the respective operating surface when the respective multifunction switch 3 is activated. Due to the weak grooves 214 mentioned above, the vibration is substantially not transmitted from the respective second area 32 to the first area 31 of the panel 210, so that an unintentional interference to the driver is prevented.

Figure 10:
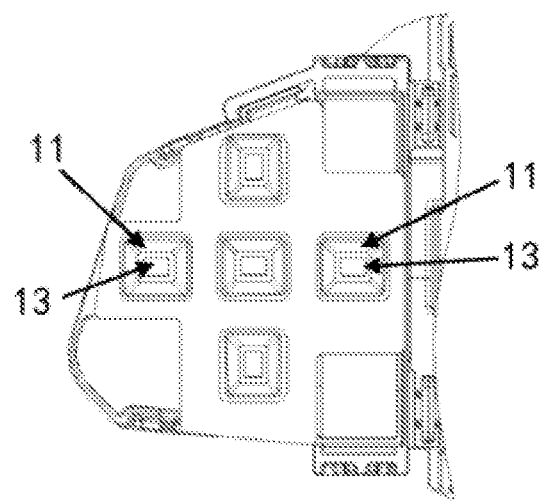
FIG. 10 is a partial top view of a multifunction switch sub-assembly of the steering wheel component of FIG. 4.

The multifunction switch sub-assembly 6 may have a light source 13 and a light guide 11, which are configured to illuminate the switch indicators 217. The light source 13 may be an LED light source, for example. A plurality of light guides 11 may be arranged above the corresponding light sources 13 and correspond to the positions of the switch indicators 217 of the panel 210 of the airbag door cover 21, and guide the light emitted by the light sources 13 to the switch indicators 217. The light guides 11 can divide the upper switch shell 61 into several areas. The number and the layout of these areas may be set according to the number and the layout of switch buttons. At least in a range of the switch indicators 217, the panel 210 of the airbag door cover 21 may be made of a transparent or translucent material, so that the switch indicators 217 can be illuminated. The illuminated switch indicators 217 allow the driver to recognize the pattern shown by the switch indicators 217 easily, especially at night, so that the driver can easily find the switch buttons by which he can activate the desired functions. As shown in FIG. 10, for example, one multifunction switch at each side of the airbag module may have one central switch indicator and four surrounding switch indicators, wherein each of the switch indicators may be provided with one light source 13 and one light guide 11.

In addition, it's possible that lights of different colors and lights of dynamic effects, such as breathing lights or flashing lights at different time intervals, can be generated by the light sources 13 through instructions sent by the controller 10. Lights of different colors or lights of dynamic effects may make the appearance of the product richer and more beautiful. Besides, a function of warning the driver of a dangerous situation may be realized.

The controller 10 and the stroke sensor 12 may be integrated in a circuit board 64. The circuit board 64 may be arranged between the switch upper case 61 and the switch lower case 62. A plurality of stroke sensors 12 may be provided in the circuit board 64. The stroke sensor 12 may be, for example, an infrared sensor or a force sensor. The infrared sensor can detect a relative movement of an object facing the infrared sensor. The force sensor can detect a force. Both sensors can generate an electric signal and transmit it to the controller 10.

The controller 10 may be configured to activate one of the functions of the multifunction switch 3 in dependence on a pressed position on the operation surface only if both the electric signal of the touch-sensitive film 215 and the electric signal of the stroke sensor 12 exist.

As shown in FIG. 5, the support plate 8 may comprise a bottom plate 81, opposite side walls 82 protruding from two opposite edges of the bottom plate 81, and side plates 83 protruding outward from the side walls 82. The side walls 82 may extend substantially vertically to the bottom plate 81. The side plates 83 may extend substantially outward from the side walls 82 and thus substantially parallel to and spaced apart from the bottom plate 81.

The airbag housing 22 may be mounted in a mounting space defined by the bottom plate 81 and the side walls 82. On each side plate 83, between this side plate 83 and the respective operating surface of the panel 210, one multifunction switch sub-assembly 6 and one horn activation assembly 7 may be mounted, wherein the horn activation assembly 7 may be arranged between the airbag and the multifunction switch sub-assembly 6.

Figure 8:
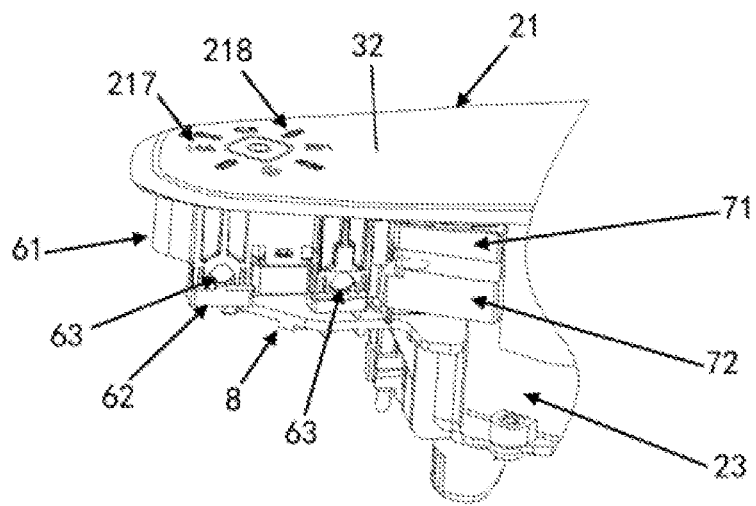
FIGS. 8 and 9 are a partial perspective view and a partial cross-sectional view of the steering wheel component of FIG. 4 in the assembled state.

An operation principle of the multifunction switch 3 is described with reference to FIGS. 8 and 9. When a driver's finger touches one of the switch indicators 217 in the respective second area 32 of the panel 210 of the airbag door cover 21, the touch-sensitive film 215 at the back side of the panel 210 of the airbag door cover 21 can detect the contact of the driver's finger with the switch indicator 217, and therefore the touch-sensitive film 215 generates an electric signal and transmits it to the controller 10. If the driver touches the switch indicator 217 only, and doesn't further press it, the stroke sensor 12 doesn't generate an electric signal. In this situation, the controller 10 doesn't send out an instruction, wherein a false trigger of a function can be avoided and thus an interference to the driver can be avoided, wherein such interference to the driver may affect the driving safety. If the driver further presses the respective switch indicator 217 of the panel 210 of the airbag door cover 21, the upper switch shell 61 fixed with the airbag door cover 21 is driven to move relative to the lower switch shell 62, wherein the elastic element 63 is squeezed. The sensor 12 can detect the relative movement, generate an electric signal and transmit it to the controller 10. The controller 10 obtains both the electric signal of the touch-sensitive film 215 and the electric signal of the stroke sensor 12, and can determine that the driver wants to activate the function corresponding to the touched switch indicator 217, so that the controller 10 can send an instruction for activating the function to a respective actuator to realize the function required by the driver. Meanwhile, the controller 10 can transmit a vibration command to the vibration exciter 65, so that the vibration exciter 65 can generate a vibration, which can be transmitted to the switch upper case 61. Because the upper switch shell 61 is fixedly connected with the respective second area 32 of the panel 210 of the airbag door cover 21, the vibration may also be transmitted to the respective second area 32 of the panel 210 of the airbag door cover 21, so that the driver can feel the vibration, and thus the driver is informed of the fact that the desired function has been activated. Thereafter, when the driver doesn't press the switch indicator 217 of the panel 210 of the airbag door cover 21 anymore, the elastic element 63 returns from the pressed state to the initial state, and thus pushes the upper switch shell 61 and the airbag door cover 21 back to the initial position, so as to be ready for a next operation of the respective multifunction switch 3. As mentioned above, it can improve a control function for the driver and provide a safer and more comfortable operating experience.

Now an operation principle of the horn activation assembly is described with reference to FIGS. 8 and 9.

When the driver presses the panel 210 of the airbag door cover 21, especially the first area 31 of the panel 210, the upper activation part 71 can move relative to the lower activation part 72 against a force of an elastic element. The stroke sensor 12 can detect the relative movement, generate an electric signal and transmit it to the controller 10. The controller 10 can determine to activate a horn activation function, and thus a vehicle horn can be turned on and sounds.

As an alternative or supplement, when the driver presses the panel 210 of the airbag door cover 21, especially one of the second areas 32 of the panel 210, the airbag door cover 21 together with the upper switch shell 61 moves relative to the lower switch shell 62, and meanwhile the elastic element 63 is squeezed. The sensor 12 on the circuit board 64 can detect the relative movement, generate an electric signal and transmit it to the controller 10. Since the driver doesn't further press any one of the switch indicators 217 at this time, the touch-sensitive film 215 at the back side of the panel 210 of the airbag door cover 21 doesn't generate an electric signal. Then, the controller 10 can determine to activate the horn activation function, and thus the vehicle horn is activated. Since the sensor 10 can detect a small relative movement, the driver can activate the horn activation function by slightly pressing the airbag door cover 21, wherein a small relative movement is generated. Therefore, in this embodiment, a touch-operatable horn activation function can be realized, wherein the driver can activate the horn activation function with a small force, and thus the driver has a good comfort.

If the driver doesn't press the airbag door cover 21 after the horn is activated, the upper activation part 71, the switch upper case 61 and the airbag door cover 21 return to the initial position, and the vehicle horn doesn't sound. It's ready for a next horn activation operation.

In the steering wheel component, the above-mentioned two operation modes of the vehicle horn activation may exist simultaneously, or alternatively only one of the two operation modes may exist.

Figure 11:
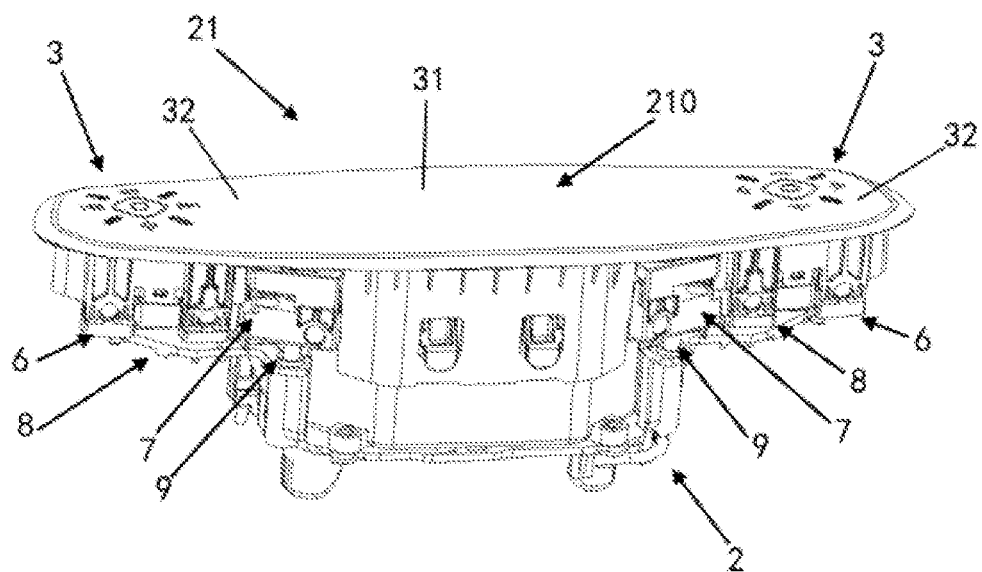
FIG. 11 is a perspective view of a steering wheel component according to another embodiment of the present invention.

FIG. 11 is a perspective view of a steering wheel component according to another embodiment of the present invention. The difference between this embodiment and the aforementioned embodiment is mainly described below, and references can be made to the description of the aforementioned embodiment in other aspects.

Referring to FIG. 11, in this embodiment, at least one mechanical microswitch 9 is arranged on a support plate 8. Alternatively, the microswitch 9 may also be mounted on an upper activation part of a horn activation assembly 7. The horn activation assembly 7 may be connected with the airbag door cover 21. The horn activation assembly 7 may have a rigid structure that is aligned with the microswitch 9. When the driver presses the airbag door cover 21, the airbag door cover 21 together with the horn activation assembly 7 moves relative to the support plate 8. Therefore, the rigid structure of the horn activation assembly 7 can push the microswitch 9, until an internal mechanism of the microswitch 9 switches on, so that the circuit of the vehicle horn switches on, and thus the vehicle horn can be activated.

It should be noted, the terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprise" and "include" (and variants thereof), when used in this specification, specify the presence of stated operations, elements, and/or components, but do not preclude the presence or addition of one or more other operations, elements, components, and/or groups thereof. As used herein, the term "and/or" includes any and all combinations of one or more of the associated listed items. Like reference numbers signify like elements throughout the description of the figures.

The thicknesses of elements in the drawings may be exaggerated for the sake of clarity. Further, it will be understood that when an element is referred to as being "on", "coupled to" or "connected to" another element, the element may be formed directly on, coupled to or connected to the other element, or there may be one or more intervening elements therebetween. In contrast, terms such as "directly on", "directly coupled to" and "directly connected to", when used herein, indicate that no intervening elements are present. Other words used to describe the relationship between elements should be interpreted in a like fashion (i.e., "between" versus "directly between", "attached" versus "directly attached", "adjacent" versus "directly adjacent", etc.).

The terms such as "top", "bottom", "above", "below", "upper" and "lower" are used to describe the relationship of one element, layer or region with respect to another element, layer or region as shown in the drawings. It will be understood that these terms should also comprise other orientations of the device besides those depicted in the drawings.

It will be understood that, although the terms "first", "second", etc. may be used herein to describe various elements, these elements should not be limited by these terms. These terms are only used to distinguish one element from another. Thus, a first element could be termed a second element without departing from the teachings of the inventive concept.

Finally, it is to be noted that, the above-described embodiments are merely for understanding the present invention but do not constitute a limit on the protection scope of the present invention. For those skilled in the art, modifications may be made on the basis of the above-described embodiments, and these modifications do not depart from the protection scope of the present invention.

The invention claimed is:

1. A steering wheel component, the steering wheel component comprising an airbag door cover, which has an integral panel, wherein the panel has a first area for closing an airbag housing and two second areas arranged beside the first area and configured as operating surfaces for a multifunction switch,
   wherein the two second areas are at two sides of the first area,
   wherein the panel extends substantially linearly,
   wherein the steering wheel component comprises a horn activation assembly, which comprises an upper activation part, a lower activation part and at least one elastic element that is arranged between the upper activation part and the lower activation part and is configured for separating the upper activation part from the lower activation part, wherein an elastic force of the at least one elastic element can be overcome by pressing the airbag door cover, so that the upper activation part and the lower activation part approach each other and thus a vehicle horn is activated.

2. The steering wheel component as recited in claim 1, wherein the panel has an integral continuous visible surface.

3. The steering wheel component as recited in claim 1, wherein at a back side of the panel in the first area of the panel, the airbag door cover has at least one of:
   a weak line, which is configured, so that a cushion, when inflating, can tear the weak line and pop out of the airbag door cover through the torn weak line when the airbag is activated, and
   a door cover wall, which is integrally formed with the panel or is fixedly connected with the panel, and which is detachably connected with an airbag housing, wherein the cushion, when folded, is received in a space surrounded by the airbag housing and the airbag door cover.

4. The steering wheel component as recited in claim 1, wherein the steering wheel component comprises a support plate, which is configured to be mounted to a steering wheel body of a steering wheel assembly, wherein at least one part of the steering wheel component is mounted to the support plate.

5. The steering wheel component as recited in claim 4, wherein the support plate comprises a bottom plate, side walls protruding from two opposite edges of the bottom plate, and side plates protruding outward from the side walls, wherein an airbag housing is mounted in a mounting space defined by the bottom plate and the side walls, wherein a respective multifunction switch sub-assembly is mounted on each side plate between the side plate and the respective operating surface.

6. The steering wheel component as recited in claim 5, wherein a horn activation assembly is mounted to each side plate between the side plate and the respective operating surface beside the multifunction switch sub-assembly, wherein the horn activation assembly is arranged between the airbag housing and the multifunction switch sub-assembly.

7. The steering wheel component as recited in claim 6, wherein the steering wheel component has a substantially T-shaped structure, wherein a handle of the T-shaped structure comprises the airbag, and two side limbs of the T-shaped structure comprise the respective multifunction switches, wherein the horn activation assembly is arranged in the handle of the T-shaped structure or forms a transition from the handle to the respective side limb.

8. The steering wheel component as recited in claim 1, characterized in that, the upper activation part is fixed relative to the airbag door cover, and the lower activation part is fixed relative to a support plate, wherein the support plate is configured to be mounted to a steering wheel body of a steering wheel assembly.

9. The steering wheel component as recited in claim 1, wherein the operating surface is a touch operating surface,
  wherein the airbag door cover has a weak groove at a back side of the panel between the first area and the two second areas, wherein the weak groove is configured to reduce vibration transmission between the first area and the two second areas.

10. The steering wheel component as recited in claim 9 wherein the multifunction switch comprises at least one of:
  a touch-sensitive film arranged at a back side of the panel in the two second areas, wherein the touch-sensitive film is configured to detect a touch on the operating surface, wherein an electric signal of the touch-sensitive film can be transmitted to a controller; and
  a multifunction switch sub-assembly, which comprises a stroke sensor for detecting a pressing stroke when the operating surface is pressed, wherein an electric signal of the stroke sensor can be transmitted to a controller.

11. The steering wheel component as recited in claim 10, wherein the controller is configured to activate one of the functions of the multifunction switch in dependence on a pressed position on the operating surface only if both the electric signal of the touch-sensitive film and the electric signal of the stroke sensor exist.

12. The steering wheel component as recited in claim 10, wherein the multifunction switch sub-assembly comprises a vibration exciter connected with the controller, wherein the vibration exciter is configured to generate a vibration that can be transmitted to the operating surface when the multifunction switch is activated.

13. The steering wheel component as recited in claim 10, wherein the multifunction switch sub-assembly comprises an upper switch shell and a lower switch shell as well as at least one elastic element that is arranged between the upper switch shell and the lower switch shell and is configured for separating the upper switch shell from the lower switch shell.

14. The steering wheel component as recited in claim 13, wherein,
  the upper switch shell is fixedly connected with the panel of the airbag door cover at a back side of the panel in the two second areas of the panel; and
  the lower switch shell is fixedly connected with a support plate which is configured to be mounted to a steering wheel body of a steering wheel assembly.

15. The steering wheel component as recited in claim 10, wherein the steering wheel component comprises a touch-operatable vehicle horn activation device, wherein a controller is configured to turn on and activate a vehicle horn when no electric signal of the touch-sensitive film exists, but the electric signal of the stroke sensor exists.

16. The steering wheel component as recited in claim 1, wherein the operating surface has one or more switch indicators which correspond to respective functions of the multifunction switch,
  wherein the operating surface has a finger guiding feature beside the switch indicator.

17. The steering wheel component as recited in claim 16 wherein the multifunction switch comprises a multifunction switch sub-assembly, which comprises a stroke sensor for detecting a pressing stroke when the operating surface is pressed, wherein an electric signal of the stroke sensor can be transmitted to a controller, wherein the multifunction switch sub-assembly has a light source and a light guide, which are configured to illuminate the switch indicator.

18. A steering wheel assembly comprising a steering wheel body and the steering wheel component as recited in claim 1 mounted to the steering wheel body.

19. The steering wheel assembly as recited in claim 18, wherein two ends of the panel of the steering wheel component are respectively adjacent to a steering wheel rim.

* * * * *